United States Patent
Iyoda

(10) Patent No.: US 8,957,964 B2
(45) Date of Patent: Feb. 17, 2015

(54) LARGE-OBJECT REMOTE COMPOSITE IMAGE ANNOTATION SYSTEM

(75) Inventor: Tetsuo Iyoda, Ashigarakami-gun (JP)

(73) Assignee: Fuji Xerox Co., Ltd., Tokyo (JP)

(*) Notice: Subject to any disclaimer, the term of this patent is extended or adjusted under 35 U.S.C. 154(b) by 2146 days.

(21) Appl. No.: 11/685,249

(22) Filed: Mar. 13, 2007

(65) Prior Publication Data

US 2008/0018740 A1 Jan. 24, 2008

(30) Foreign Application Priority Data

Jul. 18, 2006 (JP) .................. 2006-196231

(51) Int. Cl.
| | | |
|---|---|---|
| H04N 7/18 | (2006.01) | |
| H04N 5/232 | (2006.01) | |
| H04N 5/247 | (2006.01) | |
| H04N 5/262 | (2006.01) | |
| H04N 5/77 | (2006.01) | |
| H04N 5/765 | (2006.01) | |
| H04N 5/782 | (2006.01) | |

(52) U.S. Cl.
CPC ........... *H04N 7/181* (2013.01); *H04N 5/23232* (2013.01); *H04N 5/23238* (2013.01); *H04N 5/23293* (2013.01); *H04N 5/247* (2013.01); *H04N 5/2627* (2013.01); *H04N 5/772* (2013.01); *H04N 5/765* (2013.01); *H04N 5/782* (2013.01)
USPC .......................................... 348/143

(58) Field of Classification Search
USPC ............ 348/207, 211.12, 158, 157, 156, 335, 348/179, 181
See application file for complete search history.

(56) References Cited

U.S. PATENT DOCUMENTS

| | | | | |
|---|---|---|---|---|
| 5,239,373 A | * | 8/1993 | Tang et al. ................. | 348/14.01 |
| 6,554,433 B1 | * | 4/2003 | Holler ............................. | 353/79 |
| 6,597,410 B1 | * | 7/2003 | Doany et al. .................. | 348/744 |
| 6,695,451 B1 | * | 2/2004 | Yamasaki et al. .............. | 353/30 |
| 6,802,614 B2 | * | 10/2004 | Haldiman ....................... | 353/69 |
| 6,824,271 B2 | * | 11/2004 | Ishii et al. ...................... | 353/31 |
| 6,840,625 B2 | * | 1/2005 | Koyama et al. ................ | 353/31 |
| 6,853,809 B2 | * | 2/2005 | Pelletier ........................ | 396/85 |
| 7,126,630 B1 | * | 10/2006 | Lee et al. .................. | 348/218.1 |
| 7,134,080 B2 | * | 11/2006 | Kjeldsen et al. .............. | 715/730 |
| 7,134,756 B2 | * | 11/2006 | Drucker et al. ................ | 353/77 |

(Continued)

FOREIGN PATENT DOCUMENTS

| | | |
|---|---|---|
| JP | 2002072359 A | 3/2002 |
| JP | 2003058868 A | 2/2003 |

(Continued)

OTHER PUBLICATIONS

Japanese Office Action corresponding to Japanese Patent Application No. 2006-196231 dated Dec. 27, 2011.

*Primary Examiner* — Ario Etienne
*Assistant Examiner* — Blake Rubin
(74) *Attorney, Agent, or Firm* — Sughrue Mion, PLLC

(57) ABSTRACT

There is provide a remote instruction system including at least one image recorder and at least one image projector, the number of the image recorders plus the number of image projectors being three in total, the image recorder recording an image of at least a portion of a target region, the image projector projecting an annotation image on at least a portion of the target region, and the number of regions is respectively assigned within the target region to the image recorder and the image projector, according to the number of the image recorders and that of the image projectors.

6 Claims, 18 Drawing Sheets

(56) References Cited

U.S. PATENT DOCUMENTS

| | | | |
|---|---|---|---|
| 7,333,135 B2* | 2/2008 | Foote et al. | 348/211.12 |
| 7,522,186 B2* | 4/2009 | Arpa et al. | 348/153 |
| 7,679,643 B2* | 3/2010 | Shingu | 348/207.11 |
| 7,942,530 B2* | 5/2011 | Majumder et al. | 353/30 |
| 8,004,571 B2* | 8/2011 | Yamashita | 348/211.12 |
| 8,022,997 B2* | 9/2011 | Shingu et al. | 348/208.4 |
| 8,197,070 B2* | 6/2012 | Tan et al. | 353/31 |
| 2002/0024640 A1 | 2/2002 | Ioka | |
| 2002/0030637 A1* | 3/2002 | Mann | 345/8 |
| 2002/0180726 A1* | 12/2002 | Shi et al. | 345/418 |
| 2003/0001954 A1* | 1/2003 | Rantalainen | 348/136 |
| 2003/0146972 A1* | 8/2003 | Morander | 348/46 |
| 2004/0070674 A1* | 4/2004 | Foote et al. | 348/207.99 |
| 2004/0227906 A1* | 11/2004 | Cole et al. | 353/94 |
| 2004/0239885 A1* | 12/2004 | Jaynes et al. | 353/30 |
| 2005/0110959 A1* | 5/2005 | Miyazawa et al. | 353/94 |
| 2006/0038965 A1* | 2/2006 | Hennes | 353/94 |
| 2008/0068562 A1* | 3/2008 | Hirata | 353/25 |
| 2009/0059015 A1* | 3/2009 | Chiba et al. | 348/207.11 |
| 2009/0279001 A1* | 11/2009 | Miyazawa et al. | 348/745 |
| 2010/0085435 A1* | 4/2010 | Tokai | 348/207.11 |
| 2010/0271490 A1* | 10/2010 | Jung et al. | 348/207.1 |

FOREIGN PATENT DOCUMENTS

| | | |
|---|---|---|
| JP | 2003209832 A | 7/2003 |
| JP | 2005-033756 A | 2/2005 |
| JP | 2006128951 A | 5/2006 |

* cited by examiner

PIM CALIBRATION PATTERN IMAGE
WAC WIDE AREA RECORD REGION
60 CALIBRATION SCREEN

OL OVERLAP

PIM
WAC
60

PIM
WAC
60

PIM
WAC
60

PIM
WAC
60

PIM
WAC
60

LARGE-OBJECT REMOTE COMPOSITE IMAGE ANNOTATION SYSTEM

BACKGROUND

1. Technical Field

This invention relates to a remote instruction system capable of issuing an instruction from a remote place to a target.

2. Related Art

In a remote repair system, a remote maintenance system, a remote medical system, a remote meeting system or the like, for example, it is necessary to give various instructions such as an instruction of a work procedure from a remote side to a real substance side. As a remote instruction system capable of issuing an instruction from the remote side to the real substance side, while a target present at the real substance side is recorded by a video camera, a recorded image thereof is transmitted to a remote terminal. In addition, an annotation image instructed by the remote terminal based on the recorded image is projected on the target at the real substance side with the use of a projector.

In the foregoing remote instruction system, for example, the target may be arranged beyond a recorded region of the video camera. In this case, as the recorded image of the video camera, only a portion of the recorded image of the target can be transmitted to the remote side. It is not preferable for a user to instruct the annotation image based on such a recorded image.

SUMMARY

According to an aspect of the present invention, there is provide a remote instruction system including at least one image recorder and at least one image projector, the number of the image recorders plus the number of image projectors being three in total, the image recorder recording an image of at least a portion of a target region, the image projector projecting an annotation image on at least a portion of the target region, and the number of regions is respectively assigned within the target region to the image recorder and the image projector, according to the number of the image recorders and that of the image projectors.

BRIEF DESCRIPTION OF THE DRAWINGS

Exemplary embodiments of the present invention will be described in detail based on the following figures, wherein.

DETAILED DESCRIPTION

A description will now be given, with reference to the accompanying drawings, of exemplary embodiments of the present invention.

A description will be hereinafter given specifically of exemplary embodiments of the invention with reference to the attached drawings.

First Exemplary Embodiment

Figure 1:
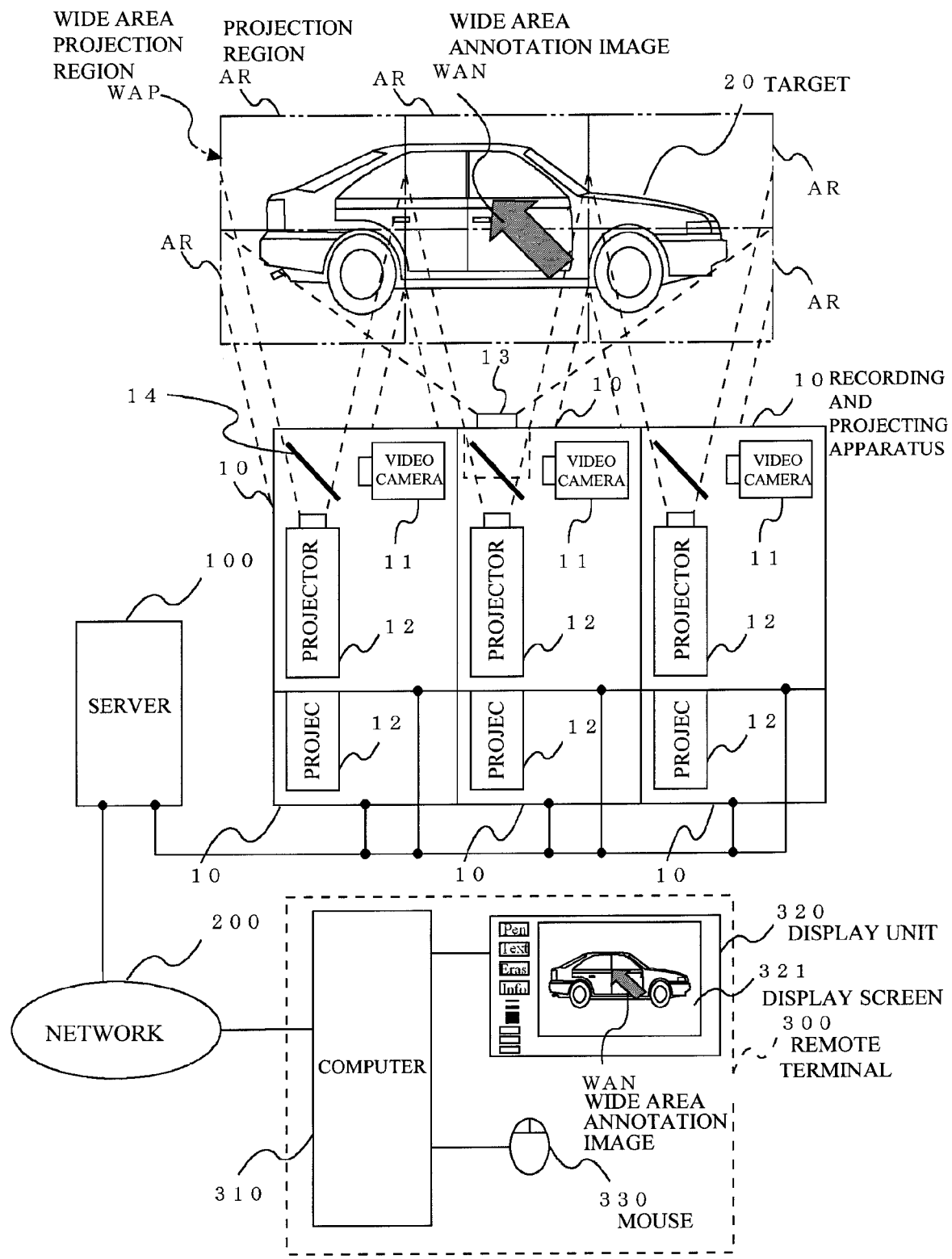
FIG. 1 is a structural diagram of a remote instruction system according to a first exemplary embodiment.
Figure 2:
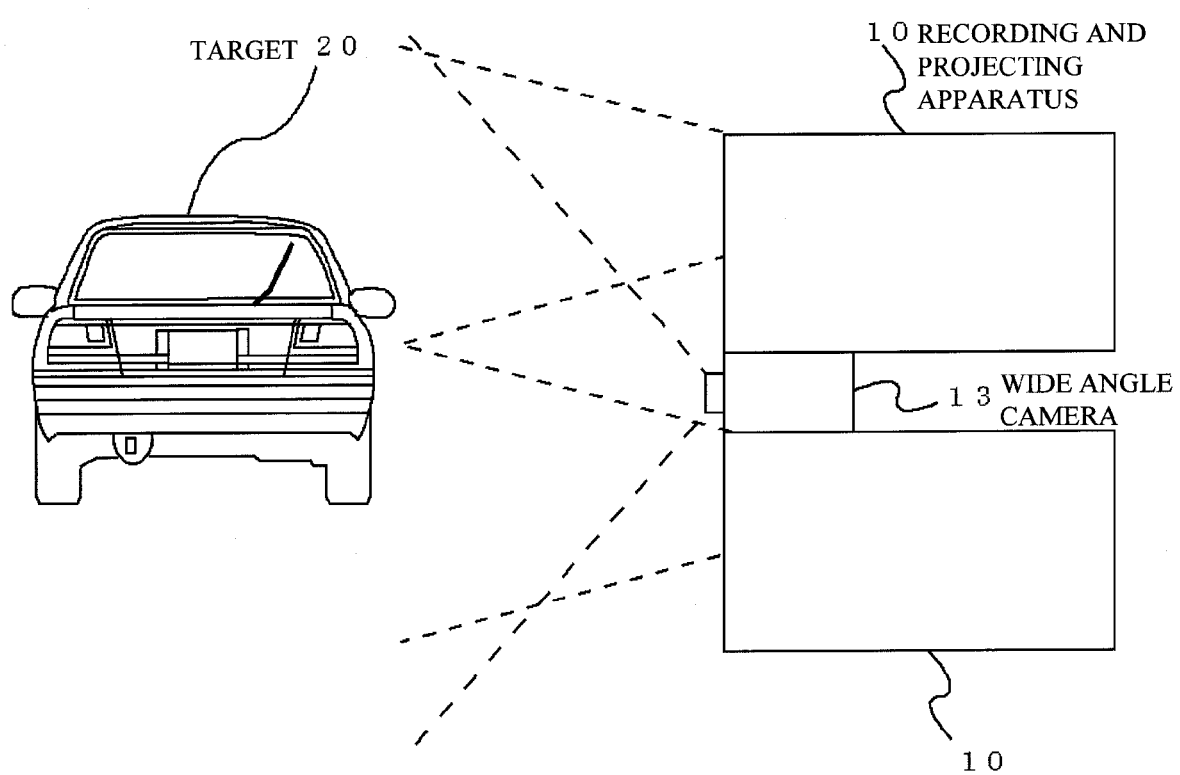
FIG. 2 is a structural diagram of the remote instruction system according to the first exemplary embodiment viewed from a side face.

FIG. 1 and FIG. 2 are structural diagrams of a remote instruction system according to a first exemplary embodiment of the invention. As shown in FIG. 1, the remote instruction system is composed of: a server 100; a remote terminal 300 connected to the server 100 via a network 200; and the like.

In the server 100, three recording and projecting apparatuses 10 are arranged in a row and two apparatuses 10 are arranged in tiers, and therefore six apparatuses 10 are formed in total. Each of the recording and projecting apparatuses 10 includes: a target 20 such as a vehicle arranged in a given region (hereinafter, referred to as target region); a video camera 11 serving as an image recorder that records the target 20; a half mirror 14 that changes a recorded field angle of the video camera 11; and a projector 12 serving as an image projector that projects an image on the target 20. The arrangement and the number of the recording and projecting apparatuses 10 are not limited to the above-described ones.

The video camera 11 is composed of, for example, a CCD (Charge Coupled Device) camera. The target 20 is arranged in a position where the video camera 11 is capable of recording, and a recorded image is taken into the server 100. In FIG. 1, each of the video cameras 11 records the target 20 reflected by the half mirror 14.

The projector 12 is arranged adjacently to the video camera 11. The projector 12 is arranged so that a visual field (field angle) thereof substantially corresponds to a visual field (field angle) of the video camera 11. As the projector 12, a liquid crystal projector or the like may be used.

By the recording and projecting apparatus 10 structured as above, the target 20 is recorded and then projected. That is, for example, the video camera 11 of the recording and projecting apparatus 10 arranged on the upper left side records the upper left side of the target 20, and the video camera 11 of the recording and projecting apparatus 10 arranged on the upper middle records the upper middle of the target 20. In this manner, although the whole image of the target 20 cannot be recorded by one video camera, the images recorded by the multiple video cameras 11 may be recorded as an entire image of the target 20.

The server 100 controls operations of the multiple video cameras 11 and the multiple projectors 12. In addition, the server 100 gives and receives various pieces of information to and from the remote terminal 300 via the network 200. Further, the server 100 sends each recorded image of the video camera 11 to the remote terminal 300, and causes the projector 12 to project on the target 20, an annotation image corresponding to an instruction based on the recorded image issued by the remote terminal 300. The annotation image is composed of any aspect such as a line, a character, a graphic, and the like.

The remote terminal 300 is composed of: a display unit 320 such as a liquid crystal display or a CRT; a computer 310 composed of a CPU; a DRAM and the like that is connected to the network 200; a pointing device (mouse) 330 connected to the computer 310; and the like. The display unit 320 displays on a display screen 321, the image or the like sent from the server 100. Based on the image, a user operates the remote terminal 300, and sends an annotation image AN with respect to the target 20 to the server 100.

Further, in the remote instruction system, as shown in FIG. 1, a wide angle camera 13 serving as an image recorder that records a wide area projection region WAP is formed. The wide angle camera 13 has a function of recording a region that cannot be recorded by each of the video cameras 11, as a single region. A recorded image of the wide angle camera 13 is taken into the server 100. It is possible to select whether the image recorded by the video camera 11 of the recording and projecting apparatus 10 is to be transmitted to the remote terminal 300 or the image recorded by the wide angle camera 13 is to be transmitted to the remote terminal 300, by providing in the server 100 a switch or the like for selecting the transmission so that a user selects by use of the switch or the like. By controlling as described above, a recorded image of a high resolution can be sent to the remote terminal 300.

Further, as shown in FIG. 2, the foregoing wide angle camera 13 is arranged between the two recording and projecting apparatuses 10 arranged in tiers. The upper video camera 11 and the lower video camera 11 of the recording and projecting apparatuses 10 are capable of recording the upper side of the target 20 and the lower side thereof, respectively. The wide angle camera 13 can record the upper side and the lower side of the target 20 as a whole. The arranged position of the wide angle camera 13 is not limited to those shown in FIG. 1 and FIG. 2, as long as the wide angle camera 13 is arranged at a position from which the entire target can be recorded.

Figure 3:
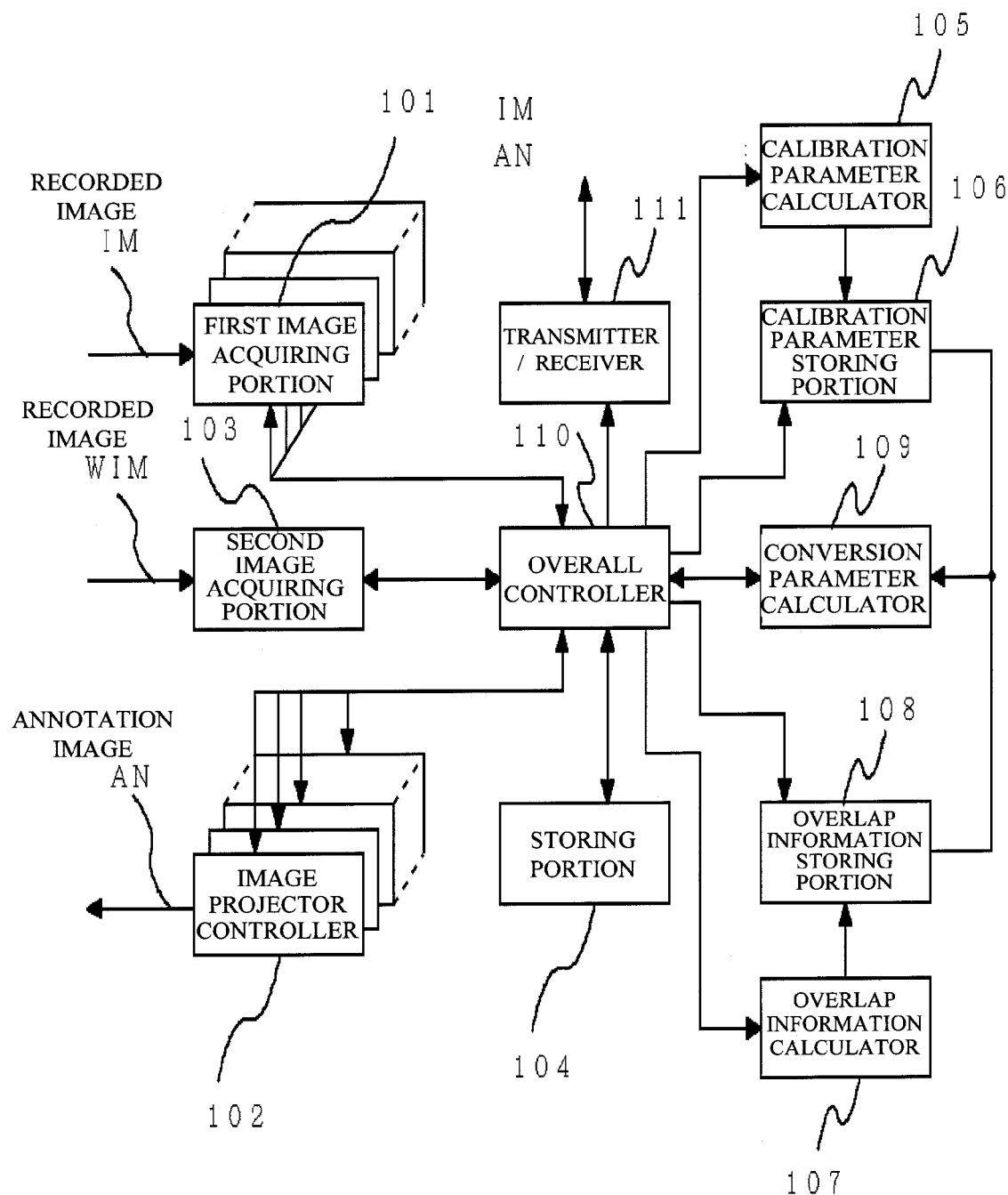
FIG. 3 is a functional block diagram of a server according to the first exemplary embodiment.

FIG. 3 is a functional block diagram of the server 100. As shown in FIG. 3, the server 100 includes: a first image acquiring portion 101 that acquires an image IM recorded by the video camera 11; an image projector controller 102 that controls operations and suspension of the projector 12 and forms the annotation image as a forming portion; and a second image acquiring portion 103 that acquires an image WIM recorded by the wide angle camera 13.

The server 100 has a storing portion 104 composed of a semiconductor storage device such as a DRAM (Dynamic Random Access Memory), an SRAM (Static RAM), or a flash memory. The storing portion 104 stores the recorded image and the like recorded by the video camera 11 and the wide angle camera 13. A transmitter/receiver 111 has a function of transmitting the recorded image of the video camera 11 and the like stored in the storing portion 104 to the remote terminal 300, and receiving a draw command of the annotation image transmitted from the remote terminal 300.

A calibration parameter calculator 105 shown in FIG. 3 has a function of calculating a calibration parameter as calibration information based on a calibration pattern image stored in the storing portion 104. The calculated calibration parameter is stored in a calibration parameter storing portion 106. An overlap information calculator 107 has a function of calculate overlap information as calibration information based on the calibration pattern image stored in the storing portion 104. The calculated overlap information is stored in an overlap information storing portion 108. The calibration pattern image is an image for adjusting the visual field of the video camera 11 and that of the projector 12, and is composed of a striped pattern, a lattice pattern, or the like.

For example, in order to install the remote instruction system, when an operator arranges the recording and projecting apparatuses 10 one by one by hand, there is the possibility that adjacent recorded regions of the video cameras 11 or adjacent projection regions of the projectors 12 are overlapped, a gap is created between the adjacent recorded regions or between the recorded region of the wide angle camera 13 and that of the video camera 11, or the adjacent recorded regions are misaligned. In each of these cases, it is difficult for an operator to correct the arrangement of the recording and projecting apparatuses 10 manually to eliminate the gap between the recorded regions or the like and to arrange the adjacent recorded regions without being overlapped.

Therefore, in order to make settings of the remote instruction system, an operator arranges the recording and projecting apparatuses 10 so that the recorded regions of the video cameras 11 are slightly overlapped. In such arrangement, an overlapped section in the recorded regions and the like is stored in the server 100 as overlap information. Further, a misaligned section (misalignment) between the recorded regions and the like is stored in the server 100 as the calibration parameter.

A conversion parameter calculator 109 has a function of calculating a conversion parameter based on the calibration parameter stored in the calibration parameter storing portion 106 and the overlap information stored in the overlap information storing portion 108. The conversion parameter is a parameter to convert position coordinates of the recorded region of the wide angle camera 13 and those of the recorded region of each of the recording and projecting apparatuses 10. Therefore, when the annotation image AN is projected on the target 20, position information of a position where the annotation image AN is projected is converted into accurate position information with the conversion parameter, and then the annotation image AN is projected on the target 20. Thereby, the annotation image AN can be projected to an accurate position of the target 20.

Operations of the above-mentioned respective functions are controlled by an overall controller 110. The overall controller 110 is composed of: a processing device such as a CPU; programs executed therein; and a storage device such as a hard disc or the like.

Figure 4:
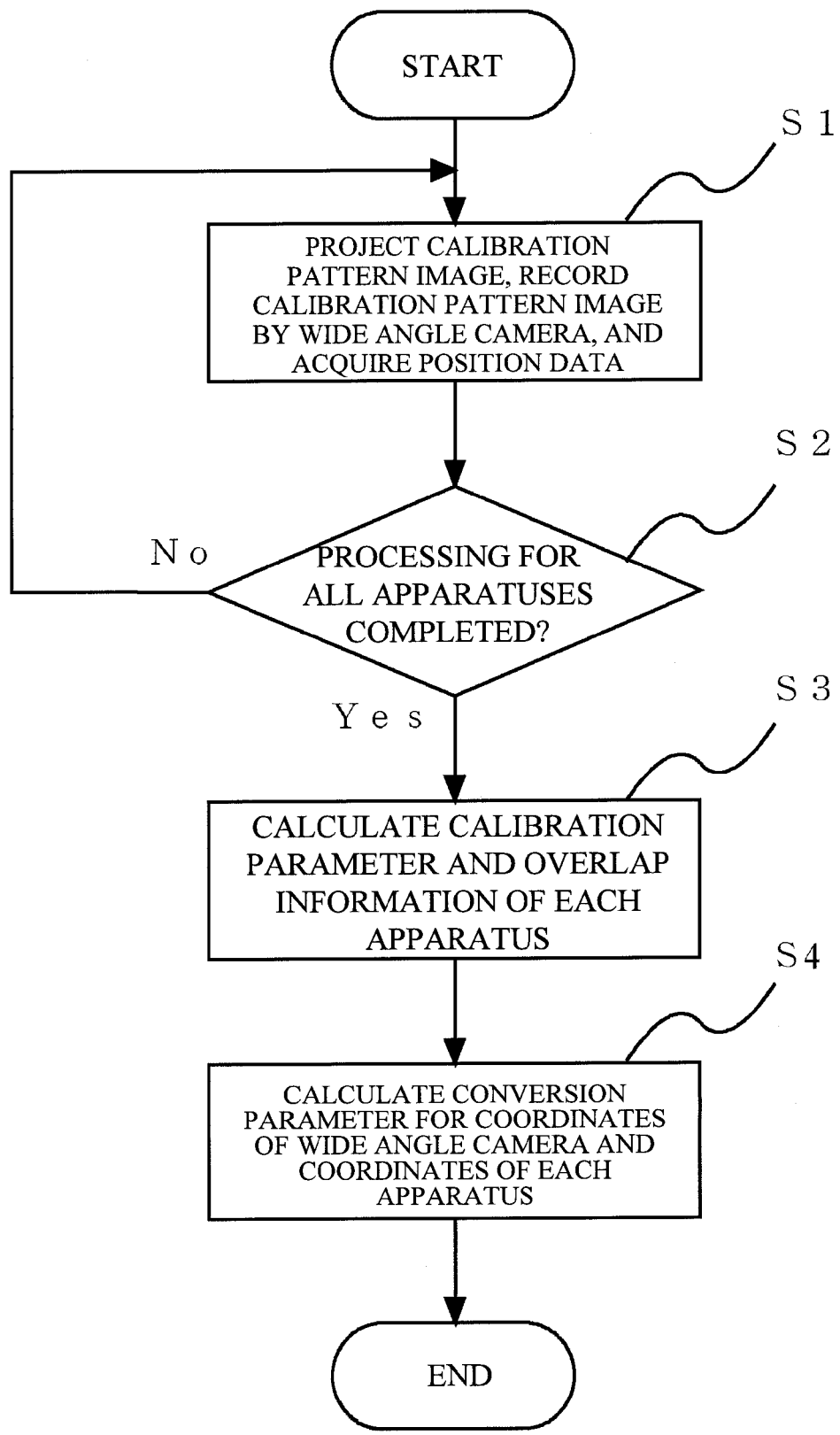
FIG. 4 is a flowchart of an initial adjustment of the remote instruction system according to the first exemplary embodiment.
Figure 5:
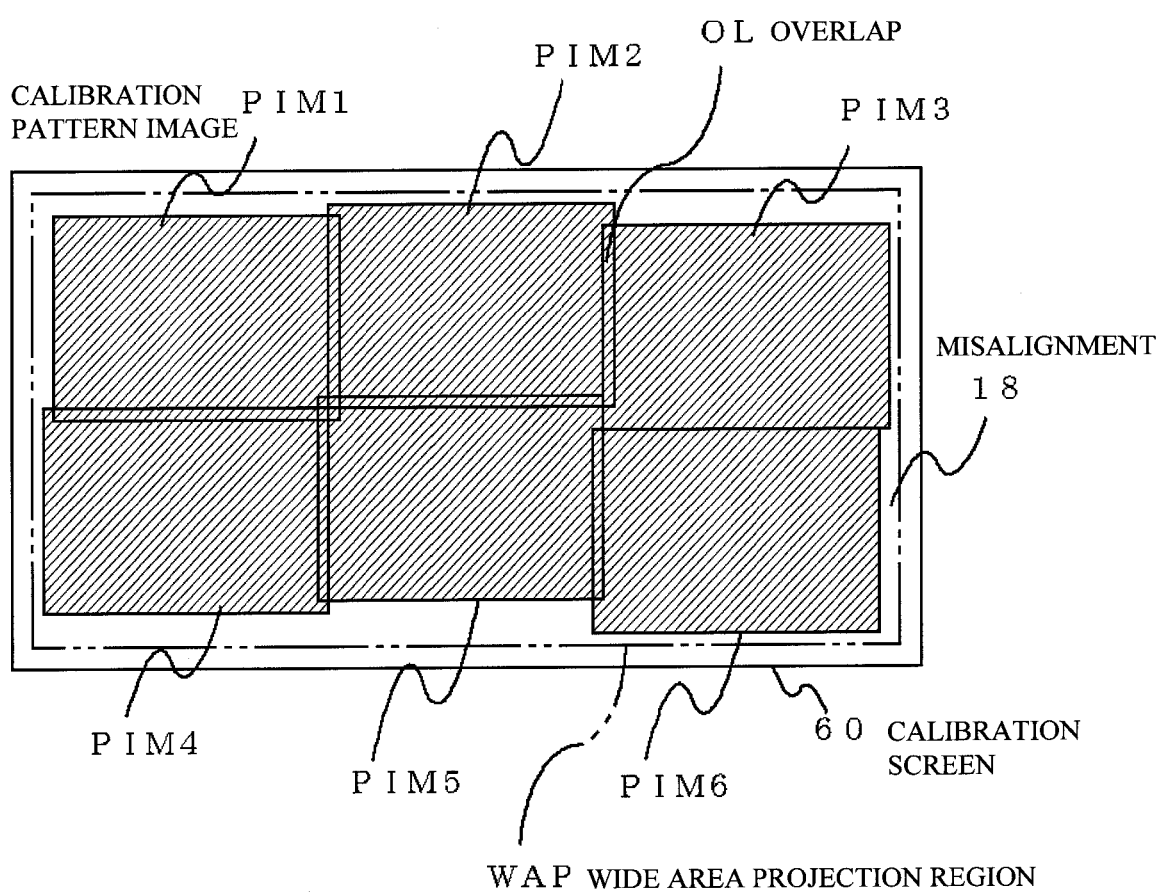
FIG. 5 is a view for explaining a calibration pattern image projected on a calibration screen.

Subsequently, a description will be given of an initial adjustment of the remote instruction system employed in the first exemplary embodiment, with reference to FIG. 4 and FIG. 5. FIG. 4 is a flowchart showing the initial adjustment of the remote instruction system employed in the first exemplary embodiment. FIG. 5 is a view explaining a calibration pattern image PIM projected on a calibration screen 60.

Firstly, an operator who installs the remote instruction system sets the calibration screen 60 at a position where the target 20 should be arranged for preparation of the settings. The calibration screen 60 is a screen in which a calibration pattern image PIM is projected by the projector 12 in each of the recording and projecting apparatuses 10 of the remote instruction system. The operator arranges the recording and projecting apparatus 10 with respect to the calibration screen 60, and prepares for projecting the calibration pattern image PIM.

Next, the projector 12 of the recording and projecting apparatus 10 arranged at the upper left side projects a calibration pattern image PIM1 on the calibration screen 60, as shown in FIG. 5. The calibration pattern image PIM1 projected on the calibration screen 60 is recorded by the wide angle camera 13. In addition, position information (position data) of the projected calibration pattern image PIM1 is acquired by the server 100 (step S1). After the processing of step S1 is finished, next, a calibration pattern image PIM2 in the recording and projecting apparatus 10 arranged at the upper middle side is recorded, and position information thereof is acquired. The processing of step S1 is performed until the remaining recording and projecting apparatuses 10 finish being installed (step S2).

When the recording and projecting apparatuses 10 finish being installed, the server 100 calculates the calibration parameter and the overlap information of each of the recording and projecting apparatuses 10 (step S3). That is, calculated are a degree of an overlap OL of each of the calibration pattern images PIM1 to PIM6 shown in FIG. 5 and each misalignment 18 between the wide area projection region WAP and the calibration pattern image PIM shown in FIG. 5. Further, based on the calibration parameter and the overlap information calculated in the processing of step S3, calculated are the conversion parameter for the position coordinates of the recorded region of each projector 12 and the position coordinates of the recorded region of the wide angle camera 13 (step S4). The calculated conversion parameter is used when a wide area annotation image WAN is projected. As described above, by acquiring the calibration parameter, the overlap information, and the conversion parameter for each of the recording and projecting apparatuses 10, the settings and the initial adjustment of the remote instruction system are completed.

Subsequently, a description will be given of the projection of the wide area annotation image WAN in the remote instruction system according to the first exemplary embodiment with reference to FIG. 6, FIG. 7A, and FIG. 7B.

Figure 6:
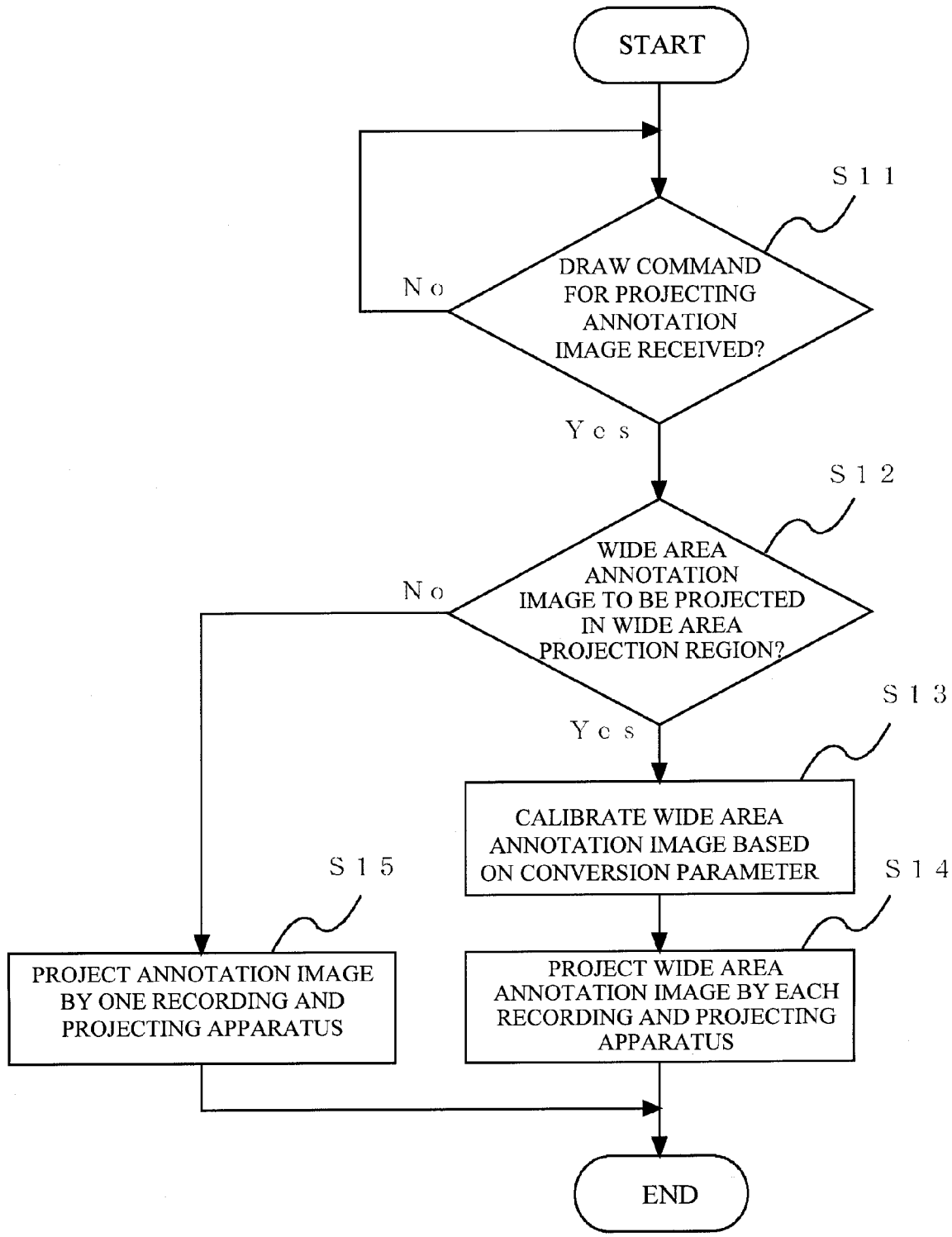
FIG. 6 is a flowchart showing projection processing of an annotation image.
Figure 7A:
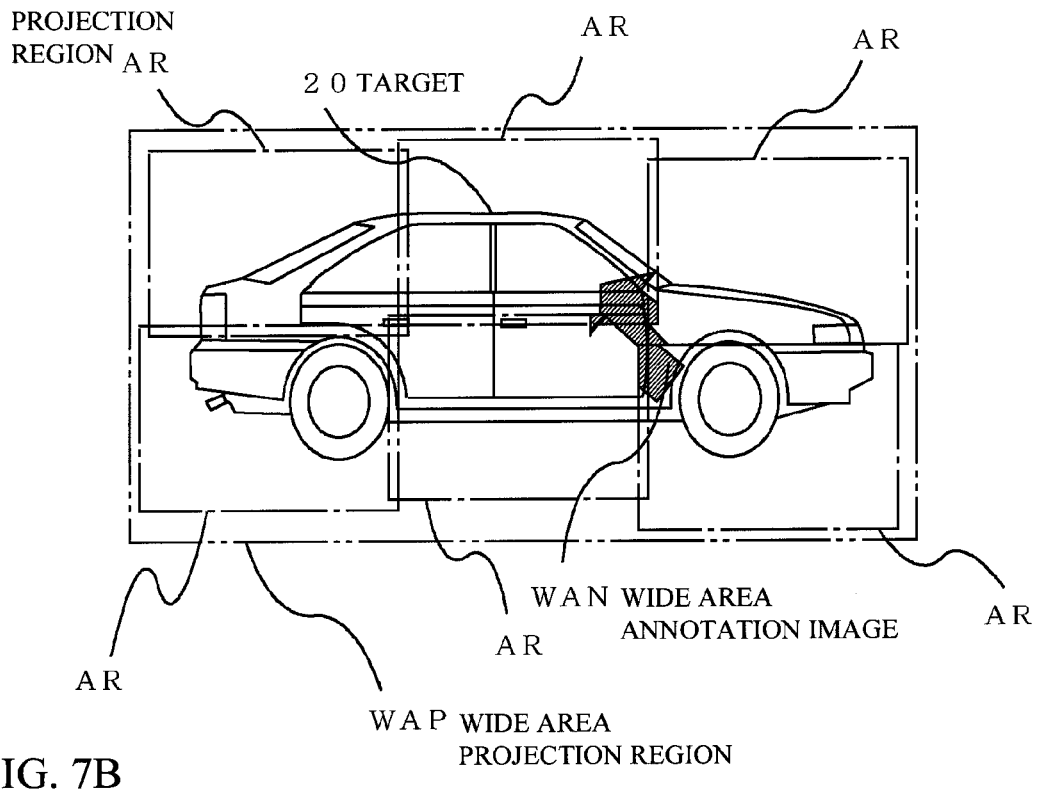
FIG. 7A and FIG. 7B are views for explaining the annotation image projected on a target.
Figure 7B:
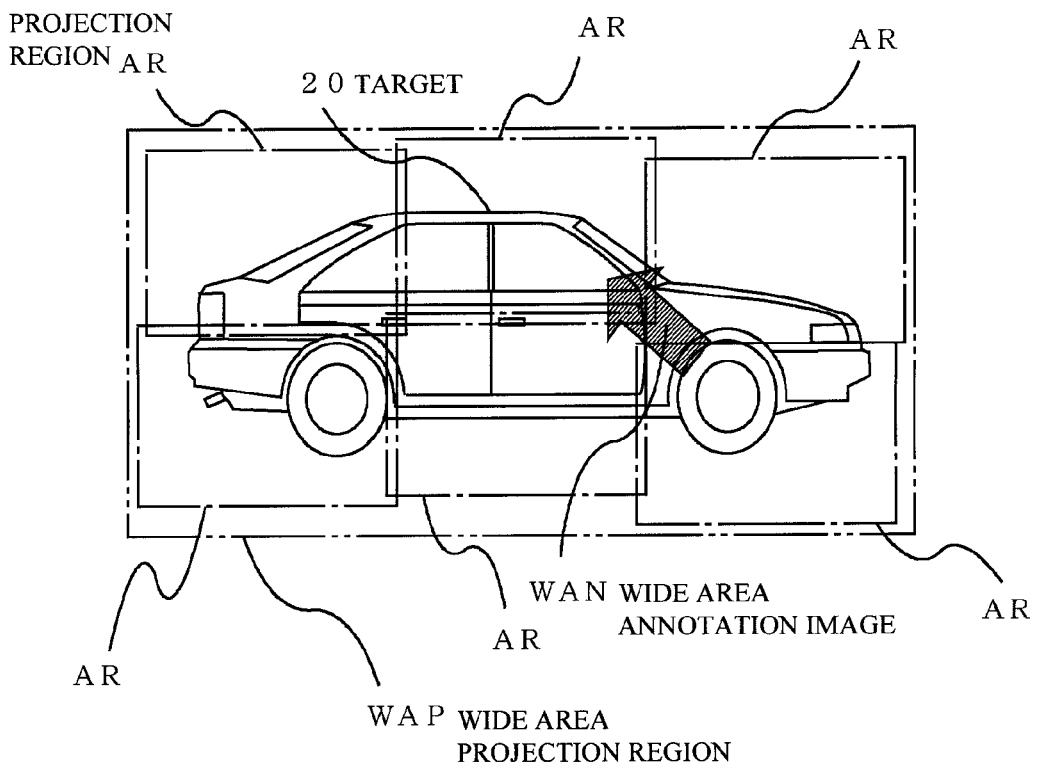

FIG. 6 is a flowchart showing an example of processing of the server 100 for projecting the wide area annotation image WAN. Firstly, the server 100 determines whether or not a draw command of the wide area annotation image WAN corresponding to an instruction based on the recorded image of the wide angle camera 13 or each video camera 11 is received from the remote terminal 300 (step S11). Such determination is made until the draw command is received.

Next, the server 100 determines whether or not the received draw command is the wide area annotation image WAN to be projected to the wide area projection region WAP formed from multiple projection regions of multiple projectors (step S12). If the received draw command is the wide area annotation image WAN, the shape of the wide area annotation image WAN is calibrated based on the foregoing conversion parameter (step S13).

That is, the draw command of the wide area annotation image WAN corresponding to the instruction based on the recorded image of the wide angle camera 13 or the like is transmitted from the remote terminal 300 to the server 100. When the server 100 causes each projector 12 to project the wide area annotation image WAN based on the instruction, the overlap OL, the misalignment 18 and the like of a projection region AR are not considered. As a result, there is the possibility that the wide area annotation image WAN is projected on the target 20 at an inaccurate position or in an inaccurate shape as shown in FIG. 7A. In other words, the wide area annotation image WAN might not be projected in a different shape from the wide area annotation image WAN instructed by the remote terminal 300.

Therefore, the server 100 converts position information of a position in the target 20 to which the received wide area annotation image WAN is projected, so that the wide area annotation image WAN is projected at an accurate position. Accordingly, as shown in FIG. 7B, the wide area annotation image WAN with the converted projection position information is projected on the target 20 from the projector 12 of each of the recording and projecting apparatuses 10 (step S14). Meanwhile, when the server 100 determines that the draw command is not for the wide area annotation image WAN, but for an annotation image that can be projected by the projector 12 of one of the recording and projecting apparatuses 10, the annotation image is projected on the target 20 by the projector 12 of the above-described one of the recording and projecting apparatuses 10 (step S15).

As described heretofore, even if the overlap OL or the like is present at a projection region AR of any of the projectors 12, the overlap OL or the like is converted with the conversion parameter in projecting the wide area annotation image WAN, and the position information of the wide area annotation image WAN can be accurately calibrated. Therefore, the wide area annotation image WAN is projected on the target 20 in the order of pixel so as to address the misalignment or the like, in the projection region AR, generated by manually making settings of the recording and projecting apparatus 10.

Second Exemplary Embodiment

Next, a description will be given of a remote instruction system according to a second exemplary embodiment of the invention. In the second exemplary embodiment, the same components and configurations as those employed in FIG. 1 have the same reference numerals and a detailed explanation will be omitted.

Figure 8:
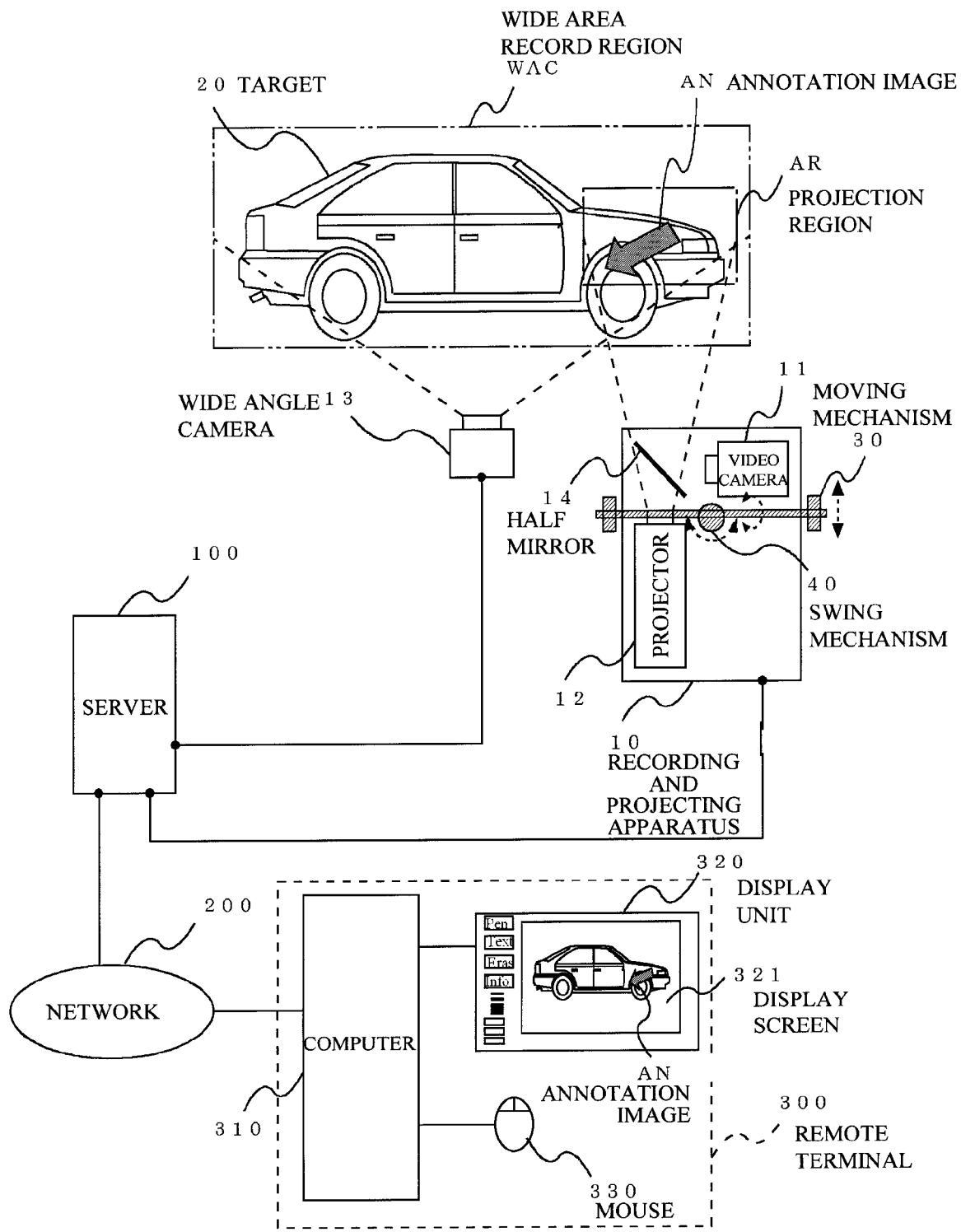
FIG. 8 is a structural diagram of a remote instruction system according to a second exemplary embodiment.
Figure 9:
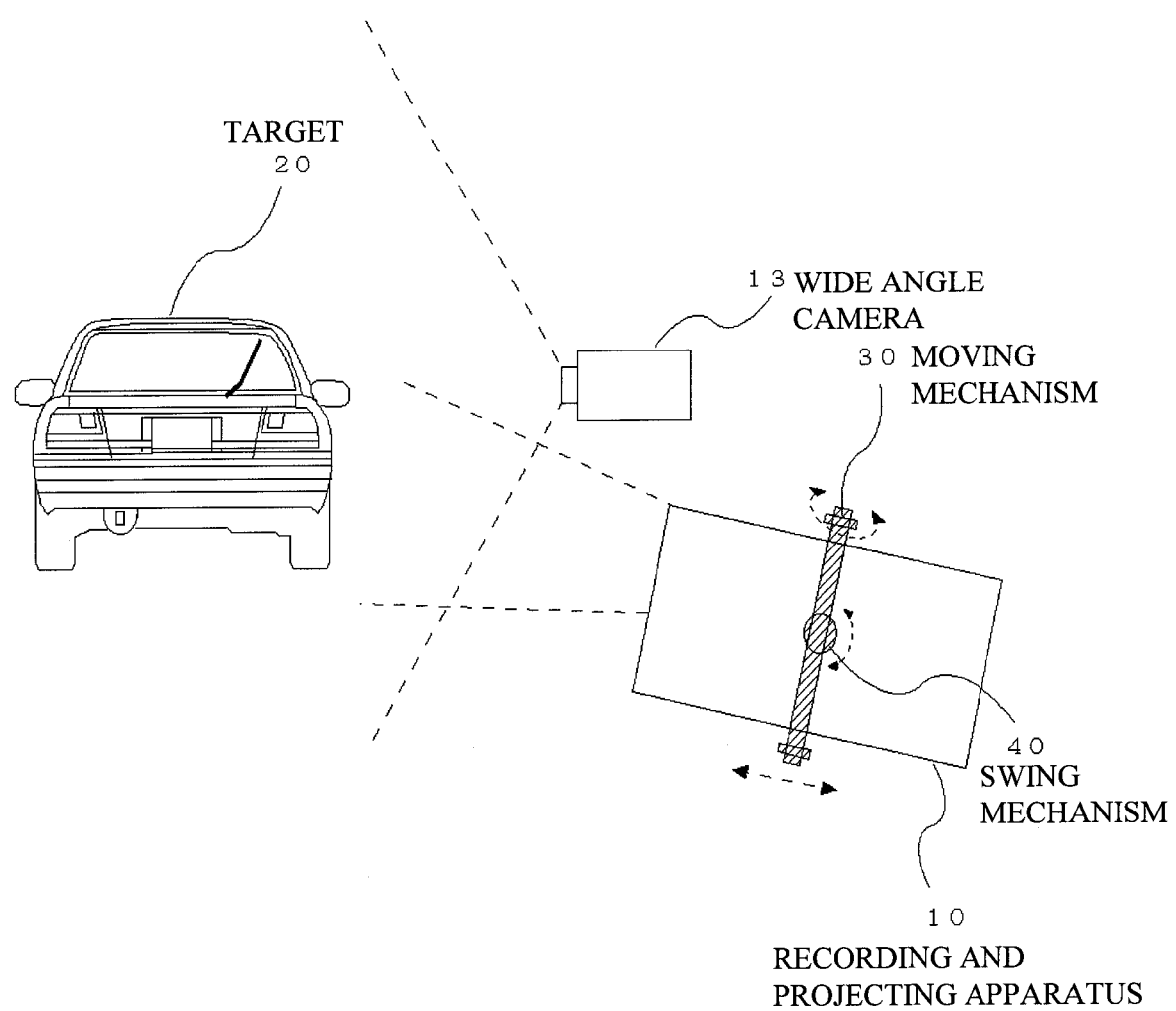
FIG. 9 is a structural diagram of the remote instruction system according to the second exemplary embodiment viewed from a side face.

FIG. 8 and FIG. 9 are structural diagrams of the remote instruction system according to the second exemplary embodiment of the invention. As shown in FIG. 8 and FIG. 9, in the remote instruction system, there is one recording and projecting apparatus 10 in the server 100. In a similar manner as the recording and projecting apparatus 10 described in the first exemplary embodiment, the video camera 11 and the projector 12 are provided in the recording and projecting apparatus 10. While the server 100 is installed outside the recording and projecting apparatus 10 in FIG. 8, a function similar to the server 100 can be provided inside the recording and projecting apparatus 10.

In the recording and projecting apparatus 10, as a moving apparatus for moving itself, there are formed: a moving mechanism 30 for enlarging and reducing the annotation image AN projected on the target 20; and a swing mechanism 40 for adjusting the projection angle with respect to the target 20. The moving mechanism 30 has a function of arranging the recording and projecting apparatus 10 to be farther from or closer to the target 20 in a direction to the target 20. The swing mechanism 40 also has a function of rotating the recording and projecting apparatus 10, and more specifically, has a function of rotating the recording and projecting apparatus 10 centering on two axes in the vertical direction and in the horizontal direction. Operations of the moving mechanism 30 and the swing mechanism 40 are controlled by the server 100.

Further, the wide angle camera 13 is provided in the server 100. The wide angle camera 13 has a function of recording the entire target 20. An image recorded by the wide angle camera 13 is taken into the server 100, and is transmitted to the remote terminal 300. In the remote terminal 300, the recorded image recorded by the wide angle camera 13 is displayed on the display screen 321 of the display unit 320. As described, even if the target 20 cannot be included on a recorded region of the video camera 11, the entire image of the target 20 can be displayed on the display unit 320 of the remote terminal 300 by using the wide angle camera 13, and a user is able to give an instruction of the annotation image AN based on the entire image.

Figure 10:
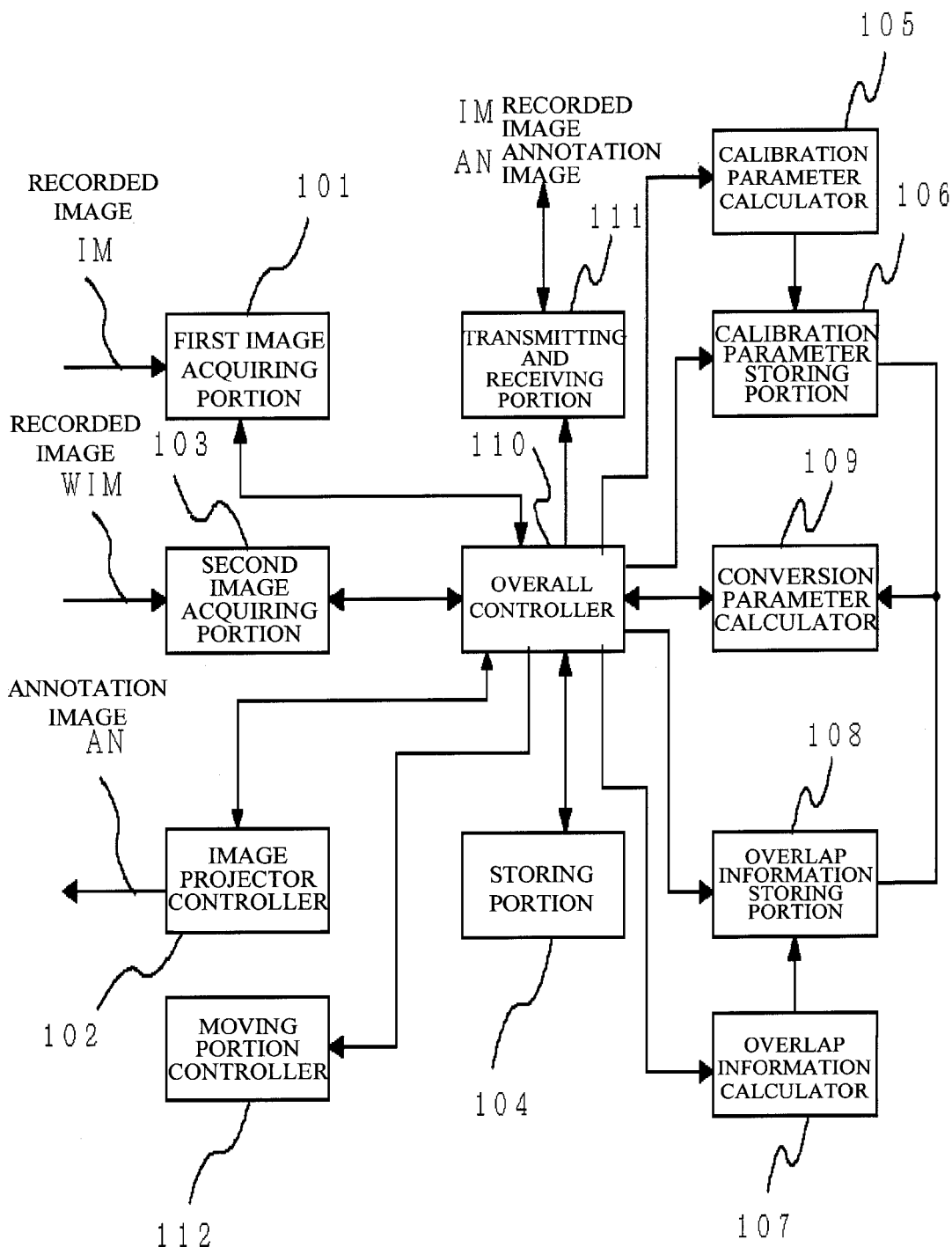
FIG. 10 is a functional block diagram of a server according to the second and a third exemplary embodiments.

FIG. 10 is a functional block diagram of the server 100 according to the second exemplary embodiment. The same components and configurations as those employed in FIG. 3 have the same reference numerals and a detailed explanation will be omitted.

In the server 100 employed in the second exemplary embodiment, one first image acquiring portion 101 and one image projector controller 102 are used. This is because one recording and projecting apparatus 10 is used in the second exemplary embodiment, whereas multiple recording and projecting apparatuses 10 are employed in the first exemplary embodiment. A moving portion controller 112 has a function of controlling the moving mechanism 30 and the swing mechanism 40 as an adjusting portion described above. The moving portion controller 112 is controlled by the overall controller 110.

Figure 11:
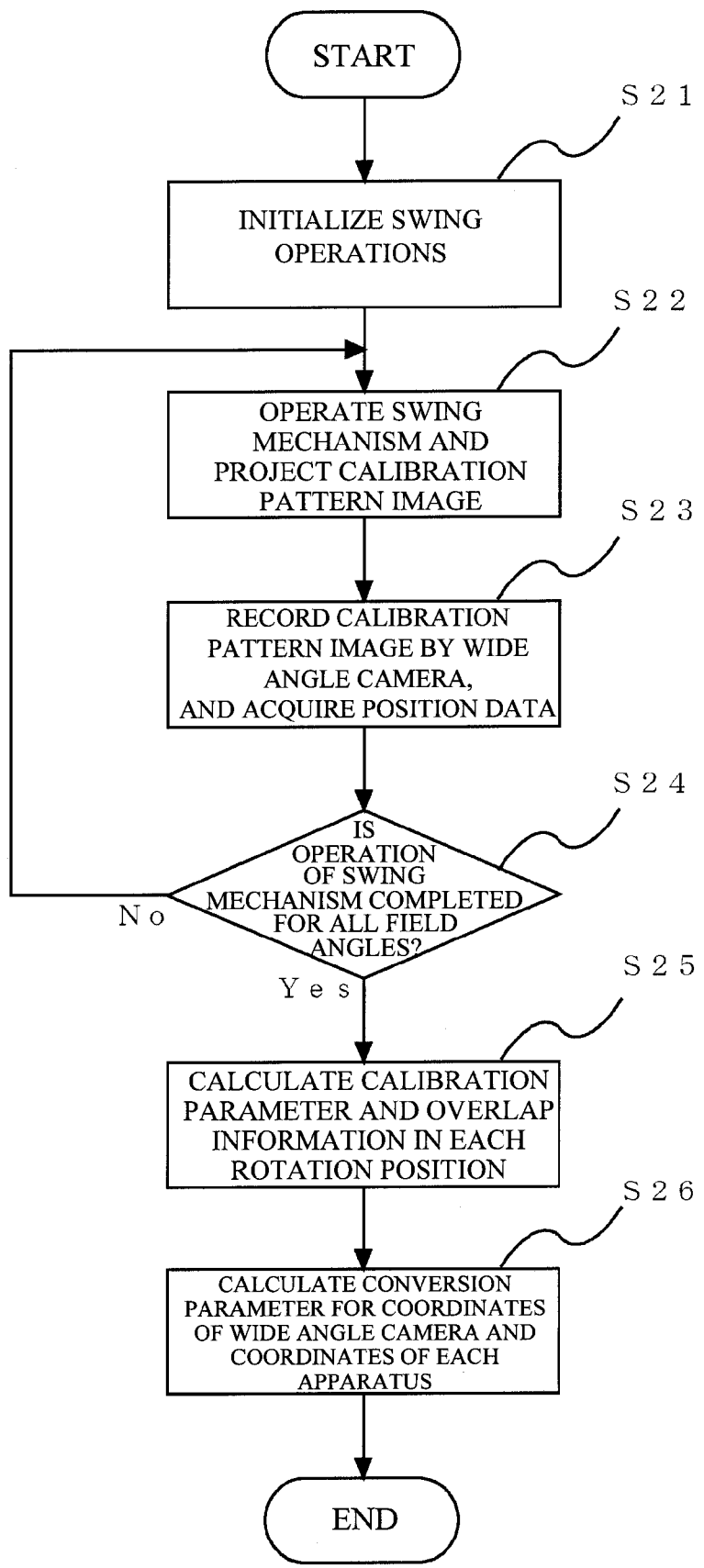
FIG. 11 is a flowchart of an initial adjustment of the remote instruction system according to the second exemplary embodiment.

Next, a description will be given of an initial adjustment of the remote instruction system according to the second exemplary embodiment with reference to FIG. 11 and FIG. 12A through FIG. 12F. FIG. 11 is a flowchart showing the initial adjustment of the remote instruction system employed in the second exemplary embodiment. FIG. 12A through FIG. 12F are views explaining the calibration pattern image PIM projected on the calibration screen 60.

Firstly, an operator who installs the remote instruction system makes settings of the calibration screen 60 in the position where the target 20 is to be arranged as shown in FIG. 12A through FIG. 12F. The operator arranges the recording and projecting apparatus 10 with respect to the calibration screen 60, and prepares for projecting the calibration pattern image PIM. Further, the operator inputs into the server 100, rotation step information as a step for rotating the recording and projecting apparatus 10.

Next, the server 100 initializes the operation of the swing mechanism 40 (step S21). By the initialization, for example, the swing mechanism 40 is configured so that, for example, a projection region of the projector 12 is located on the upper left side of a wide area recorded region WAC of the wide angle camera 13. By setting the swing mechanism 40 in this manner, position information will be smoothly acquired later by the wide angle camera 13.

Figure 12A:
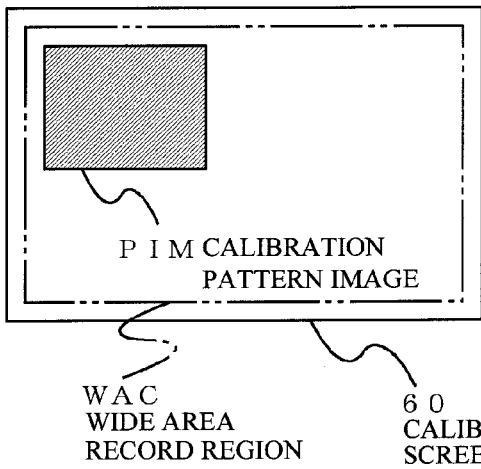
FIG. 12A through FIG. 12F are views for explaining a calibration pattern image projected on a calibration screen.
Figure 12B:
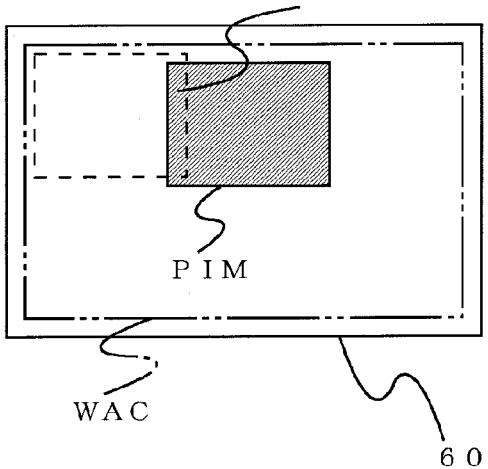
Figure 12C:
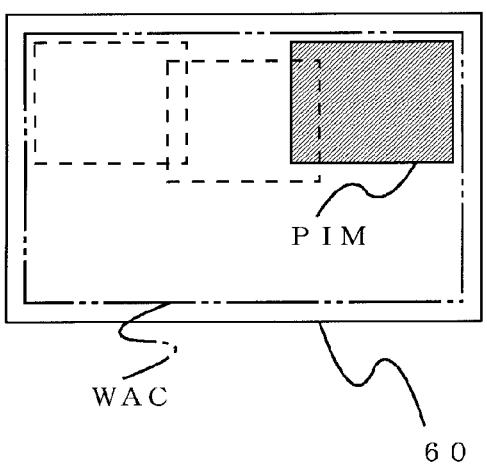
Figure 12D:
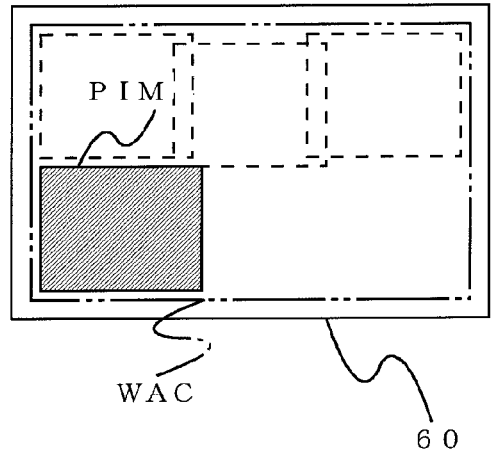
Figure 12E:
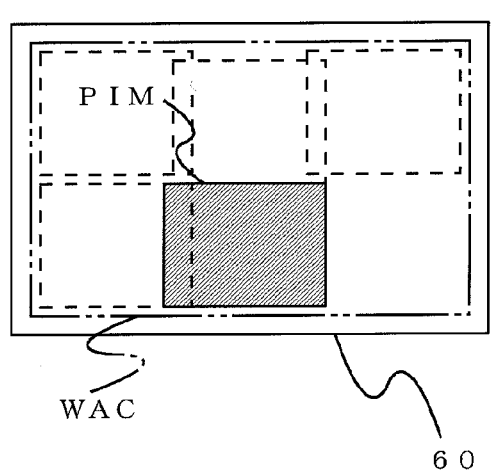
Figure 12F:
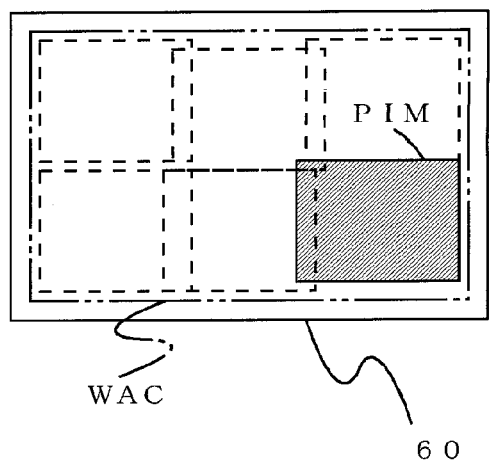

Next, the server 100 causes the projector 12 to project the calibration pattern image PIM on the calibration screen 60, and controls the operation of the swing mechanism 40 (step S22). The swing mechanism 40 operates to superimpose the projection region of the projector 12 on the wide area recorded region WAC. More specifically, first, as shown in FIG. 12A, the projector 12 projects the calibration pattern image PIM in the upper left position of the wide area recorded region WAC of the wide angle camera 13. That is, such a position corresponds to the position set by the initialization described in the processing of step S21.

When the calibration pattern image PIM is projected on the calibration screen 60, the server 100 causes the wide angle camera 13 to record the calibration pattern image PIM, and acquires the projection position of the calibration pattern image PIM as position information (position data) (step S23). The processing of step S22 and that of step S23 are performed until the operation of the swing mechanism 40 is completed for all field angles (step S24).

Therefore, after the server 100 acquires the position information of the calibration pattern image PIM shown in FIG. 12A, the swing mechanism 40 shifts to the next field angle based on the rotation step information input into the server 100. The server 100 causes the projector 12 to project the calibration pattern image PIM in the position shown in FIG. 12B. After that, the swing mechanism 40 operates based on the rotation step information to project the calibration pattern image PIM on the calibration screen 60 in the order from FIG. 12C to FIG. 12F. Whenever the swing mechanism 40 operates as described, the server 100 caused the wide angle camera 13 to record the calibration pattern image PIM, and acquires position information of the calibration pattern image PIM.

When the server 100 detects that the position information of the calibration pattern image PIM is acquired for all visual fields (field angles) of the projector 12, the server 100 calculates the calibration parameter and the overlap information in each rotation position (step S25). Further, based on the calibration parameter and the overlap information calculated in the processing of step S25, the server 100 calculates a conversion parameter for position information of the recorded region of the wide angle camera 13 and position information of the projection region of the projector 12. The conversion parameter is used when the annotation image AN is projected on the target 20.

As described, by acquiring the calibration parameter, the overlap information, and the conversion parameter for the recording and projecting apparatus 10, the settings and the initial adjustment of the remote instruction system are completed.

Subsequently, a description will be given of projecting the annotation image in the remote instruction system according to the second exemplary embodiment, with reference to FIG. 13 and FIG. 14.

Figure 13:
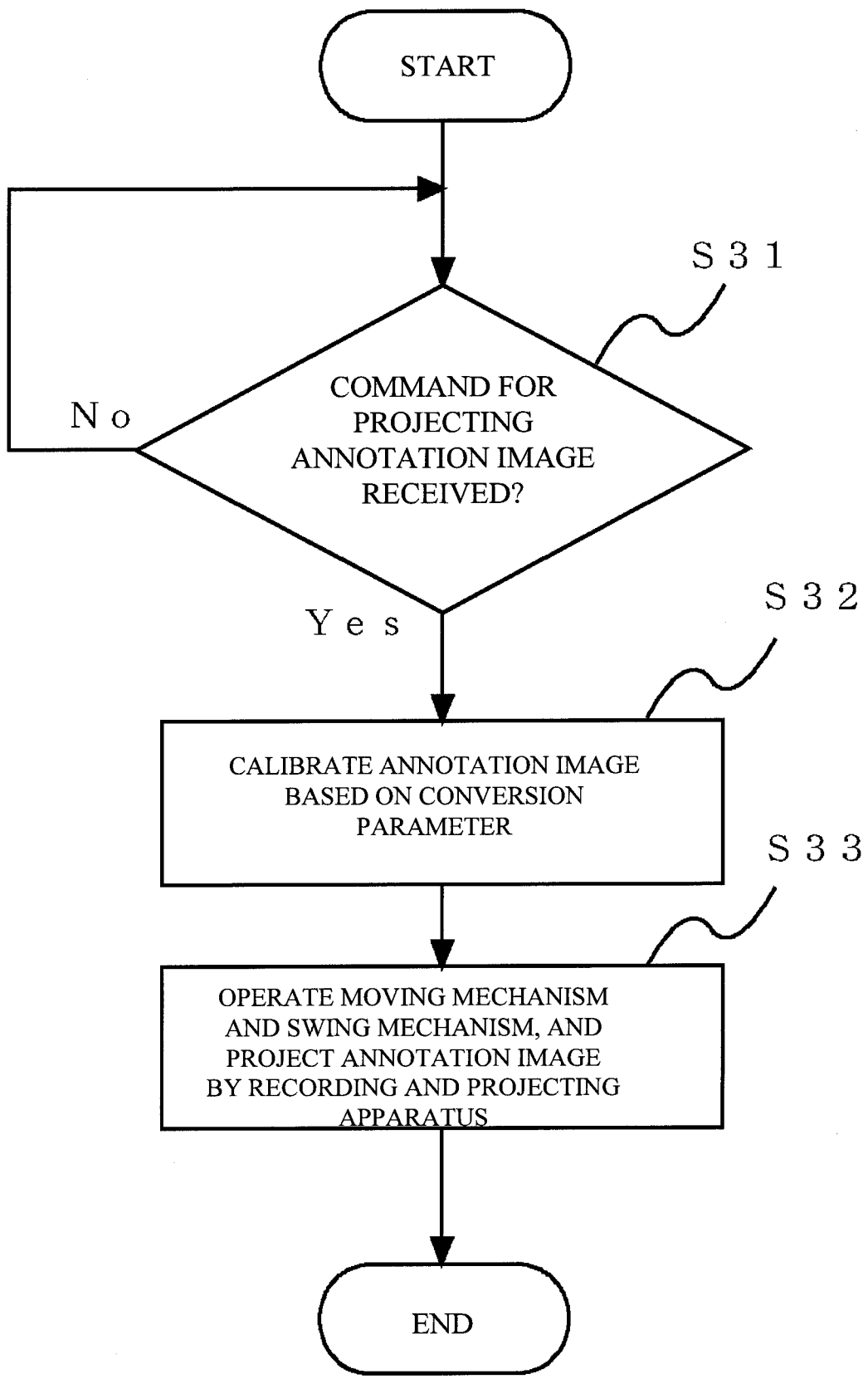
FIG. 13 is a flowchart showing projection processing of an annotation image.

FIG. 13 is a flowchart showing an example of processing of the server 100 for projecting the annotation image AN. Firstly, the server 100 determines whether or not a draw command of the annotation image AN corresponding to an instruction based on a recorded image of the wide angle camera 13 is received from the remote terminal 300 (step S31). The recorded image is not limited to the recorded image of the wide angle camera 13. Recorded images of the target 20 recorded by the video camera 11 of the recording and projecting apparatus 10, while the video camera 11 is being moved the swing mechanism 40 or the like, may be combined and such combined image may be transmitted to the remote terminal 300 as an entire recorded image. Such determination is made until the draw command is received. When the server 100 receives the draw command, the shape of the annotation image AN is calibrated based on the foregoing conversion parameter (step S32).

That is to say, the draw command of the annotation image AN corresponding to the instruction based on the recorded image of the wide angle camera 13 or the like is transmitted from the remote terminal 300 to the server 100. When the server 100 causes each projector 12 to project the annotation image AN based on the instruction, overlapping in the projection region and the like described above is not considered. This results in the possibility that the annotation image AN is projected in a different shape from the annotation image AN instructed by the remote terminal 300. For example, the annotation image AN might be projected on the target 20 in an inaccurate position or in an inaccurate shape.

Therefore, the server 100 converts position information of a position in the target 20 to which the received annotation image AN is projected, so that the annotation image AN can be projected in an accurate shape. Then, while the server 100 is operating the moving mechanism 30 and the swing mechanism 40, as shown in FIG. 14, the projector 12 of the recording and projecting apparatus 10 moves and projects the annotation image AN with the converted position information on the target 20 (step S33).

In this manner, even if the overlap OL or the like is present in the projection region AR of the projector 12, misalignment of the annotation image AN caused by the overlap OL or the like is converted based on the conversion parameter in projecting the annotation image AN, and the position information of the annotation image AN can be calibrated with accuracy. Therefore, alignment can be made in the order of pixel so as to address the overlap of the projection region AR caused by setting the recording and projecting apparatus 10 manually.

Further, when the projection angle of the projector 12 set by the swing mechanism 40 is not perpendicular to the angle of the target 20, that is, when the swing angles for two axes are not 0 degree, the projection region AR has a shape of distorted rectangle according to the projection position. However, such a relation can be calibrated by a known mathematically easy method. Further, as compared to the first exemplary embodiment, multiple recording and projecting apparatuses are not used, in the second exemplary embodiment. Therefore, the cost of the remote instruction system can be reduced.

Third Exemplary Embodiment

Next, a description will be given of a remote instruction system according to a third exemplary embodiment of the invention.

Figure 15:
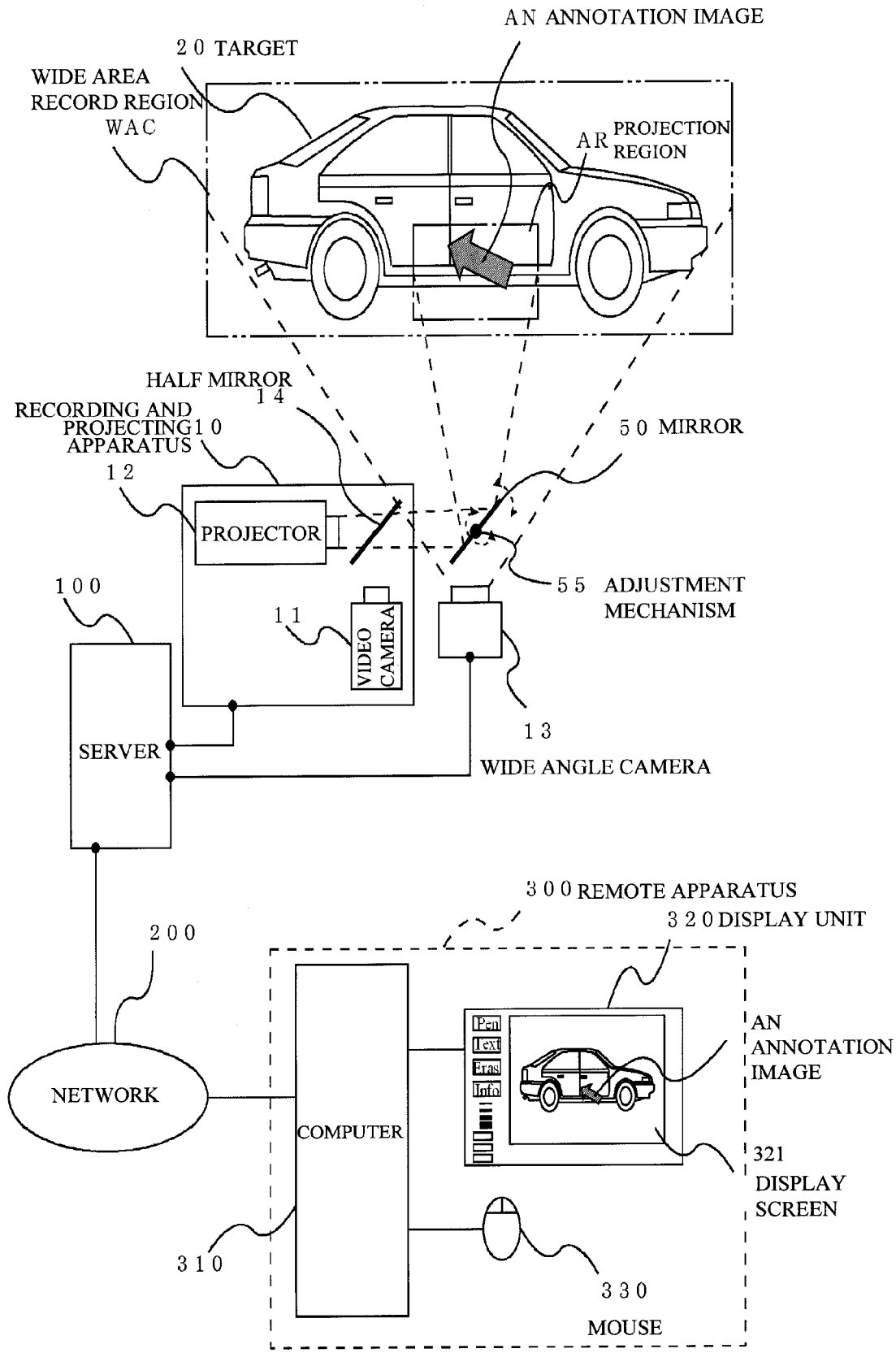
FIG. 15 is a structural diagram of a remote instruction system according to the third exemplary embodiment.
Figure 16:
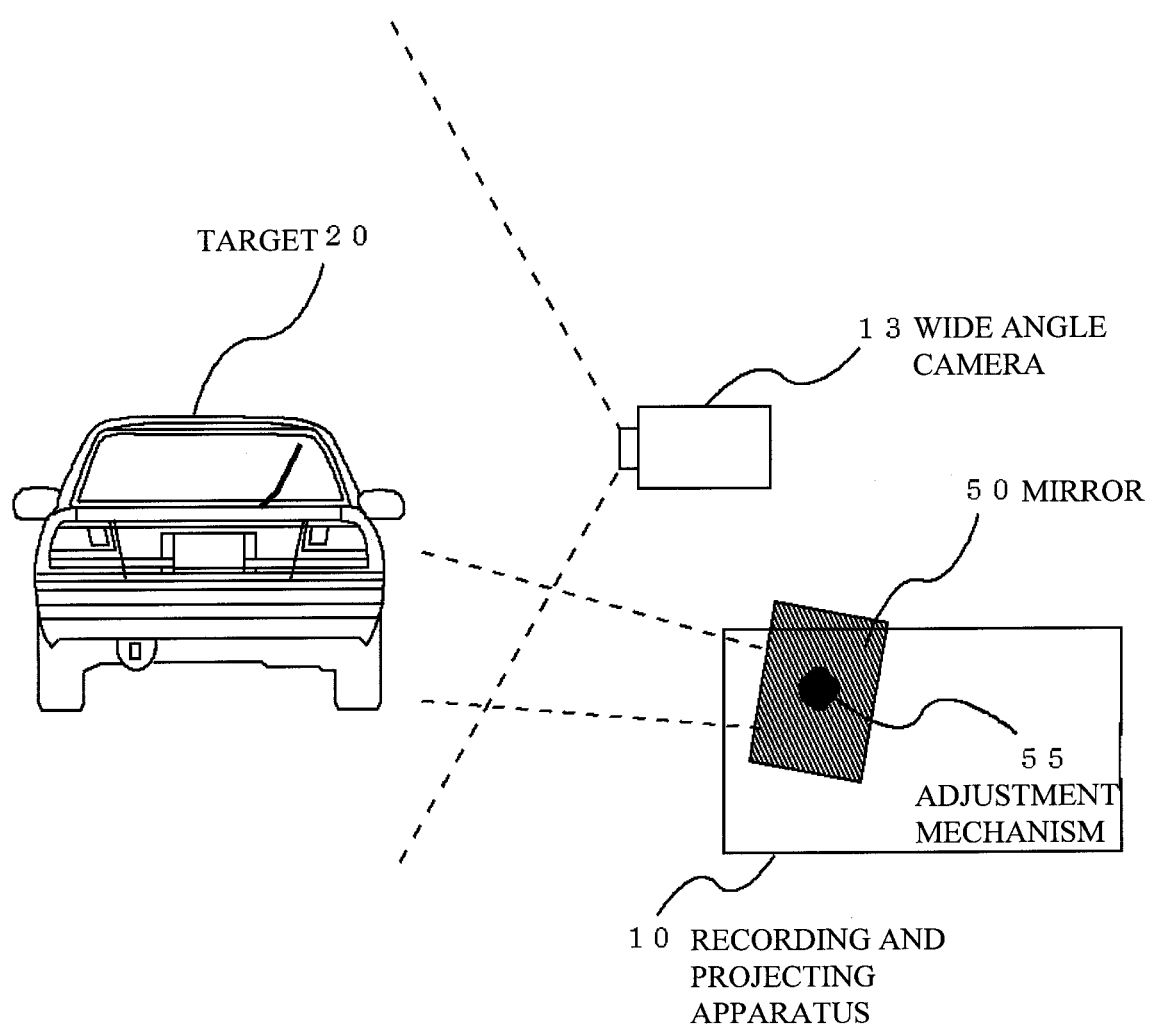
FIG. 16 is a structural diagram of the remote instruction system according to the third exemplary embodiment viewed from a side face.

FIG. 15 and FIG. 16 are structural diagrams of the remote instruction system according to the third exemplary embodiment of the invention. As shown in FIG. 15 and FIG. 16, in the remote instruction system, one recording and projecting apparatus 10 is provided in the server 100. In a similar manner as described in the recording and projecting apparatus 10 used in the first exemplary embodiment, the video camera 11, the projector 12 and the like are provided in the recording and projecting apparatus 10.

Further, in the recording and projecting apparatus 10, the wide angle camera 13 is provided as described in the second exemplary embodiment. The wide angle camera 13 has a function of recording the entire target 20. An image recorded by the wide angle camera 13 is taken into the server 100, and is transmitted to the remote terminal 300. In the remote terminal 300, the received recorded image of the wide angle camera 13 is displayed on the display screen 321 of the display unit 320.

Further, in the recording and projecting apparatus 10, a mirror 50 and an adjustment mechanism 55 that rotates the mirror 50 to adjust the projection angle of an image are formed as a moving portion. The mirror 50 has a function of reflecting the calibration pattern image PIM and the annotation image AN projected by the projector 12, toward the target 20. The mirror 50 has a function of biaxially rotating about the direction perpendicular to an optical axis direction of the projector 12.

That is to say, in the second exemplary embodiment, the server 100 projects on the target 20, the annotation image AN projected by the projector 12 with the use of the moving mechanism 30 and the swing mechanism 40. Meanwhile, in the third exemplary embodiment, the server 100 can project the annotation image AN projected by the projector 12 on the target 20, by moving the mirror 50.

Figure 17:
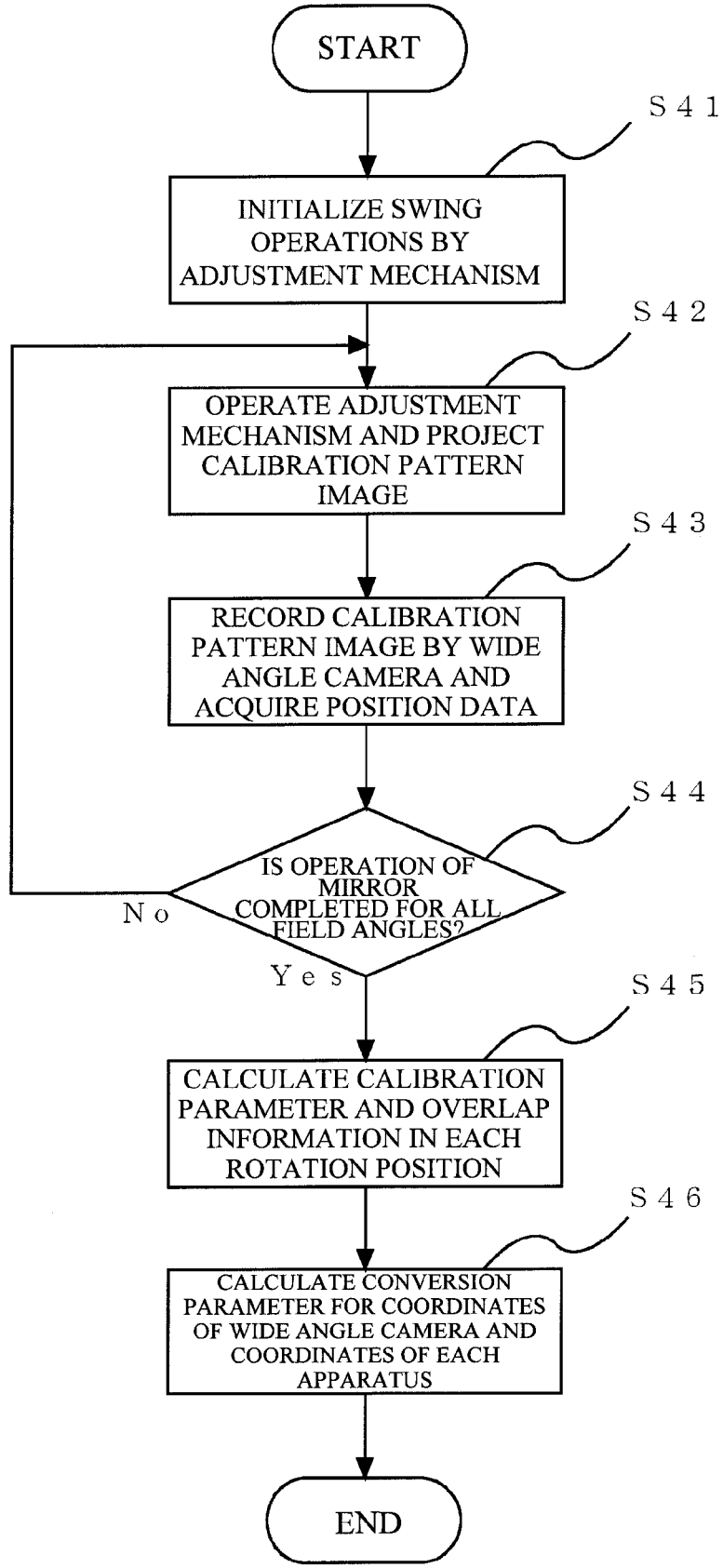
FIG. 17 is a flowchart of an initial adjustment of the remote instruction system according to the third exemplary embodiment.

Next, a description will be given of an initial adjustment of the remote instruction system according to the third exemplary embodiment, with reference to FIG. 17. FIG. 17 is a flowchart showing the initial adjustment of the remote instruction system in the third exemplary embodiment. Since the calibration pattern image PIM projected on the calibration screen 60 is similar to those in FIG. 12A through FIG. 12F, the description thereof will be omitted.

Firstly, an operator who installs the remote instruction system sets the calibration screen 60 in a position where the target 20 is to be set. The operator arranges the recording and projecting apparatus 10 with respect to the calibration screen 60 and prepares for projecting the calibration pattern image PIM. Further, the operator inputs rotation step information as a step of rotating the mirror 50 to the server 100.

Next, the server 100 controls the operation of the adjustment mechanism 55 and initializes the operation of the mirror 50 (step S41). By the initialization, for example, the adjustment mechanism 55 is configured so that, for example, a projection region of the projector 12 is located on the upper left side of the wide area recorded region WAC of the wide angle camera 13. By setting the mirror 50 as described, position information will be smoothly acquired later by the wide angle camera 13.

Next, the server 100 causes the projector 12 to project the calibration pattern image PIM onto the calibration screen 60, and operates the adjustment mechanism 55 (step S42). The mirror 50 rotated by the operation of the adjustment mechanism 55 operates to overlay the projection region of the projector 12 on the wide area recorded region WAC of the wide angle camera 13.

When the calibration pattern image PIM is projected on the calibration screen 60, the server 100 causes the wide angle camera 13 to record the calibration pattern image PIM, and acquires the projection position of the calibration pattern image PIM as position information (position data) (step S43). The processing of step S42 and that of step S43 are performed until the operation of the mirror 50 is completed for all field angles (step S44).

When the server 100 detects that the position information of the calibration pattern image PIM is acquired for the all visual fields (field angles) of the projector 12, the server 100 calculates a calibration parameter and overlap information in each rotation position (step S45). Further, based on the calibration parameter and the overlap information calculated in the processing of step S45, the server 100 calculates a conversion parameter for the position information of the recorded region of the wide angle camera 13 and position information of the projection region of the projector 12 (step S46). The conversion parameter is used when the annotation image AN is projected on the target 20.

Subsequently, a description will be given of projecting the annotation image of the remote instruction system according to the third exemplary embodiment with reference to FIG. 18.

Figure 14:
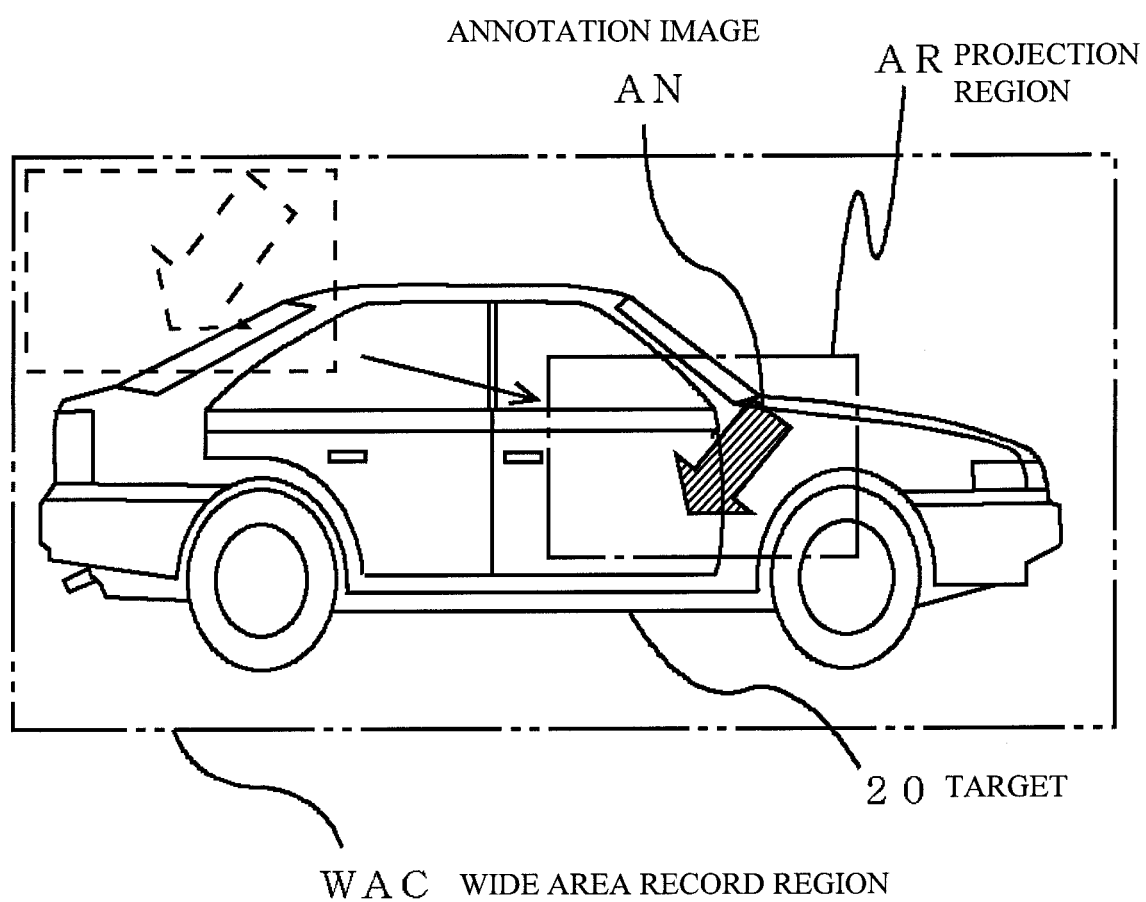
FIG. 14 is a view for explaining the annotation image projected on a target.

Since the annotation image AN projected on the target 20 is similar to that in FIG. 14, the description thereof will be omitted.

Figure 18:
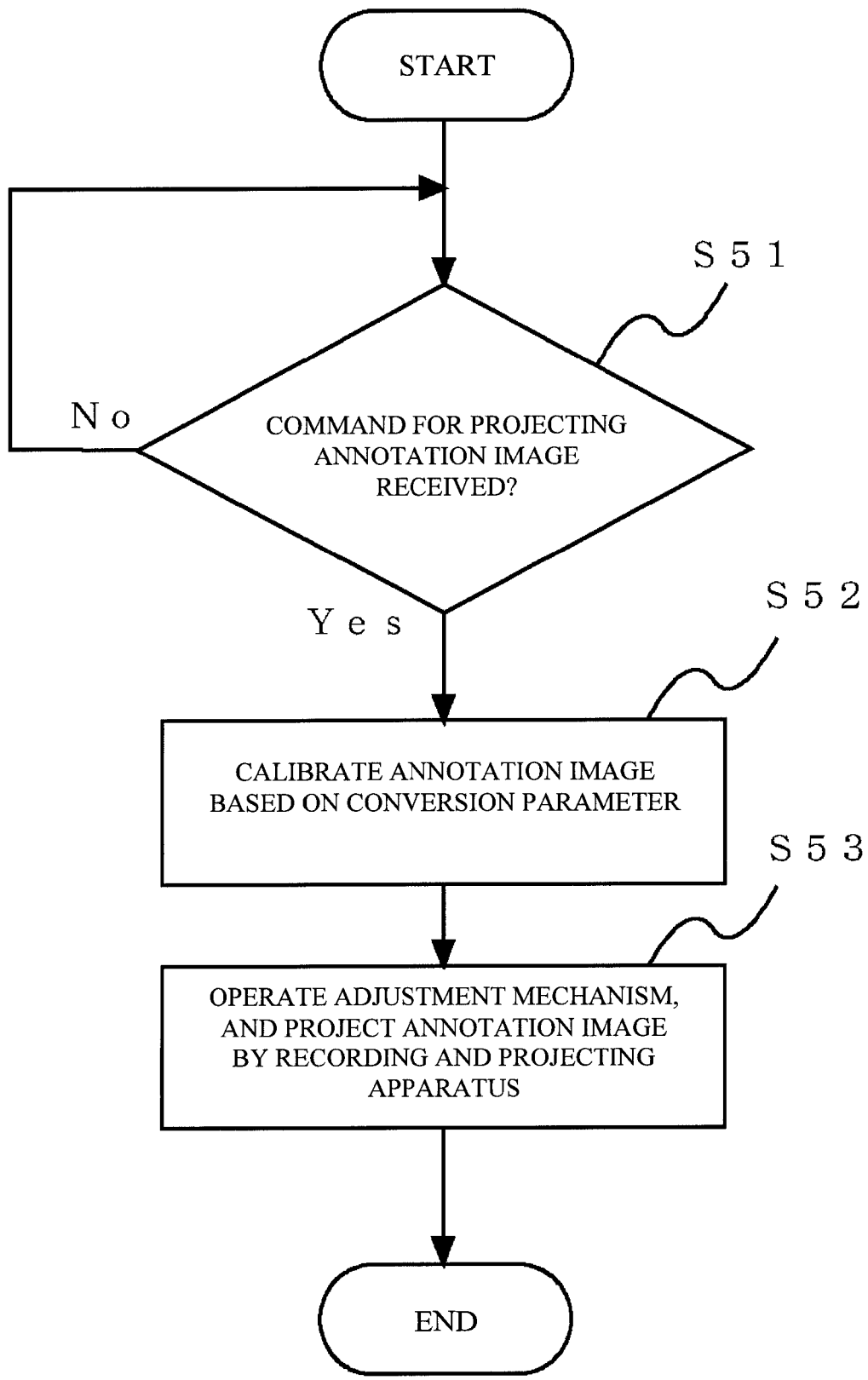
FIG. 18 is a flowchart showing projection processing of an annotation image.

FIG. 18 is a flowchart showing projection operations of the server 100 for projecting the annotation image WAN. Firstly, the server 100 determines whether or not a draw command of the annotation image AN corresponding to an instruction based on a recorded image of the wide angle camera 13 is received from the remote terminal 300 (step S51). Such determination is made until the draw command is received. When the server 100 receives the draw command, the shape of the annotation image AN is calibrated by the foregoing conversion parameter (step S52).

That is to say, the draw command of the annotation image AN corresponding to the instruction based on the recorded image of the wide angle camera 13 is transmitted from the remote terminal 300 to the server 100. When the server 100 causes each projector 12 to project the annotation image AN based on the instruction, no consideration is given to overlapping and the like of the projection region described with reference to FIG. 12A through FIG. 12F in the second exemplary embodiment. As a result, there is the possibility that the annotation image AN is projected in a different shape from the wide area annotation image AN instructed by the remote terminal 300. For example, the annotation image AN might be projected on the target 20 at an inaccurate position or in an inaccurate shape.

Therefore, the server 100 converts position information of a position in the target 20 to which the received annotation image AN is projected, so that the annotation image AN is projected in an accurate shape. Then, while the server 100 is operating the adjustment mechanism 55, as shown in FIG. 14, the projector 12 of the recording and projecting apparatus 10 projects on the target 20, the annotation image AN with the converted position information (step S53).

As described heretofore, even if the overlap OL or the like is present in the projection region AR of the projector 12, the annotation image AN misaligned by the overlap OL or the like is converted by the conversion parameter in projecting the annotation image AN, and the position information of the annotation image AN can be accurately calibrated. Therefore, it is possible to make an alignment in the order of pixel to address overlapping of the projection region AR caused by manual settings of the recording and projecting apparatus 10. Further, the annotation image can be projected on the target 20 by providing the mirror 50 and the adjustment mechanism 55 to rotate the mirror 50. Therefore, as compared to the second exemplary embodiment with the moving mechanism 30 moving the entire recording and projecting apparatus 10 and the swing mechanism 40, the size of the entire apparatus can be reduced.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

CROSS-REFERENCE TO RELATED APPLICATIONS

This application is based on and claims priority under 35 USC 119 from Japanese Patent Application No. 2006-196231 filed Jul. 18, 2006.

What is claimed is:

1. A remote instruction system comprising:
a plurality of recording and projecting apparatuses that collectively handle a handled region of a target, the handled region of the target being divided into a plurality of sub-regions and each of the plurality of recording and projecting apparatuses handling a sub-region among the plurality of sub-regions and comprising a video recorder that records the sub-region and a projector that projects an annotation image onto the sub-region, wherein a field angle of the video recorder corresponds to a field angle of the projector;
a wide area video recorder that records a wide area covering an entirety of the handled region; and
a controller that, for each of the plurality of recording and projecting apparatuses, calibrates a projection position of the annotation image with respect to the sub-region before projecting based on a conversion parameter and controls the projector to project the calibrated annotation image, the conversion parameter being a parameter to convert position coordinates of the sub-region handled by the recording and projecting apparatus and those of the wide area recorded by the wide area video recorder, and projects the calibrated annotation image using the converted position coordinates onto the target.

2. The remote instruction system according to claim 1, further comprising a remote terminal that forms the annotation image and transmits the annotation image to the controller.

3. The remote instruction system according to claim 1, further comprising a conversion parameter creating portion that controls the projectors to project calibration images on the sub-regions, controls the video recorders and the wide area video recorder to record the calibration images respectively, and creates a conversion parameter based on the comparison result between the recoded calibration images of the video recorders and the recoded calibration image of the wide area video recorder.

4. A remote instruction system for controlling a wide area video recorder to record a wide area that includes a plurality of different regions that are overlapped with adjacent regions and at least one of a plurality of projectors to project an annotation image corresponding to an instruction based on a recorded image of the wide area video recorder comprising:
a memory;
a first calculating portion that calculates an overlap information that represents a degree of an overlap of calibration pattern images, based on a position in the recorded image of each of the calibration pattern images that is projected corresponding to the plurality of different regions by the each of the plurality of projectors;
a second calculating portion that determines that there is a misalignment between the wide area and the calibration pattern images when a gap is created between the wide area and an area occupied by all of the calibration pattern images in the recorded image, and calculates the misalignment as a calibration parameter;
a third calculating portion that calculates a conversion parameter for a position of each of the plurality of different regions and a position of the wide area, based on the overlap information calculated by the first calculating portion and the calibration parameter calculated by the second calculating portion; and a calibrating portion that calibrates a shape of the annotation image, based on the conversion parameter calculated by the third calculating portion when the annotation image is projected over the plurality of different regions, wherein the first calculating portion, the second calculating portion, the third calculating portion, and the calibrating portion are stored in the memory.

5. The remote instruction system according to claim 4, further comprising a forming portion that forms the annotation image projected over the plurality of different regions with a combination of images projected by the plurality of projectors, wherein the forming portion is stored in the memory.

6. The remote instruction system according to claim 4, further comprising:

a server that manages the wide area video recorder and the plurality of projectors; and a remote terminal that issues an instruction by forming the annotation image based on the recorded image received from the wide area video recorder and transmitting the formed annotation image to the projector corresponding to the projection position.

* * * * *